United States Patent

Conner

[11] Patent Number: 5,929,966
[45] Date of Patent: Jul. 27, 1999

[54] FOLDING EYE GLASS FRAMES WITH LENGTH ADJUSTABLE TEMPLES

[76] Inventor: William A. Conner, 2694 Bayside Walk, San Diego, Calif. 92109

[21] Appl. No.: 09/047,266

[22] Filed: Mar. 24, 1998

[51] Int. Cl.$^6$ .............................. G02C 5/20; G02C 5/24; G02C 5/08
[52] U.S. Cl. .............................. 351/118; 351/119; 351/63
[58] Field of Search ..................................... 351/118, 119, 351/111, 63, 41; 2/454

[56] References Cited

U.S. PATENT DOCUMENTS

| 5,347,325 | 9/1994 | Lei ......................................... 351/118 |
| 5,448,317 | 9/1995 | Huang ..................................... 351/118 |

FOREIGN PATENT DOCUMENTS

WO95/12140  5/1995  WIPO.

*Primary Examiner*—Hung Xuan Dang
*Attorney, Agent, or Firm*—Frank D. Gilliam

[57] ABSTRACT

Foldable glasses having telescoping temples and central pivoting bridge. The temples are shown with three or four telescoping elements. The four element temple has a distal element that is preformed from material that has a memory which when extended curves around the ear of the user and when the elements are telescoped together can be straightened for inserting in the adjacent straight telescopic element. Two bridge pivoting embodiments are shown, one has a angled pivot pin and the other has a spring biased pivotal section wherein the adjacent pivotal elements are vertically and horizontally translatable against the spring bias when the frame elements are folded for non-use.

16 Claims, 3 Drawing Sheets

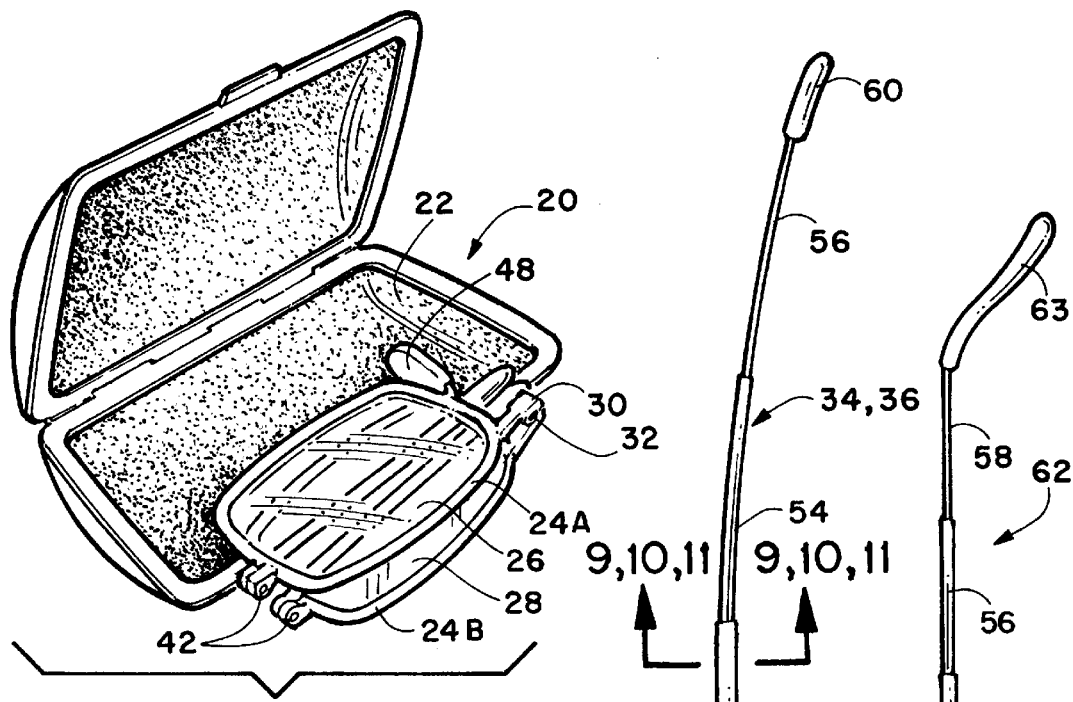
FIGURE 1
FIGURE 4
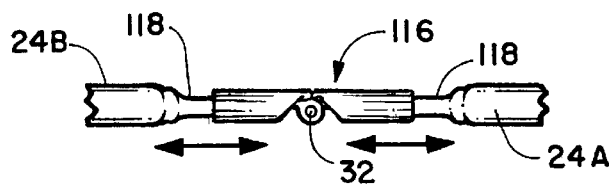
FIGURE 14
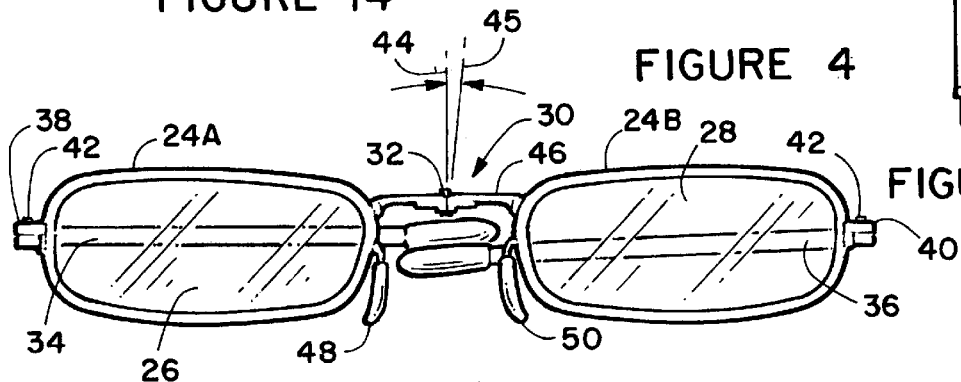
FIGURE 3
FIGURE 5
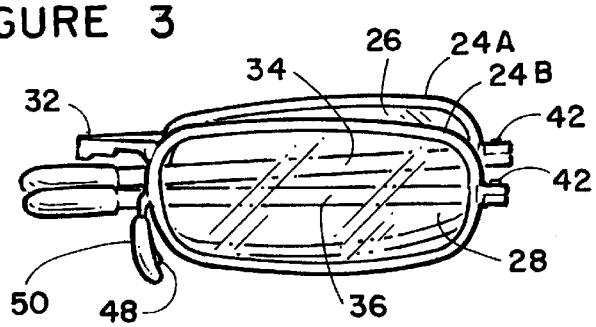
FIGURE 2

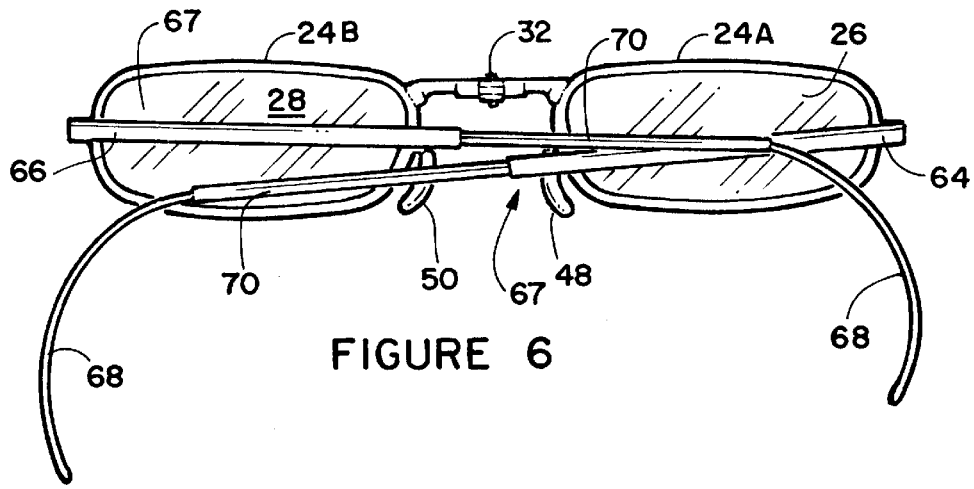
FIGURE 6
FIGURE 9
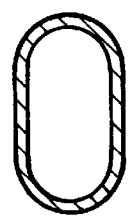
FIGURE 10
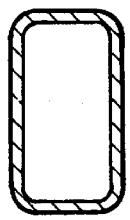
FIGURE 11
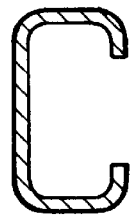
FIGURE 12
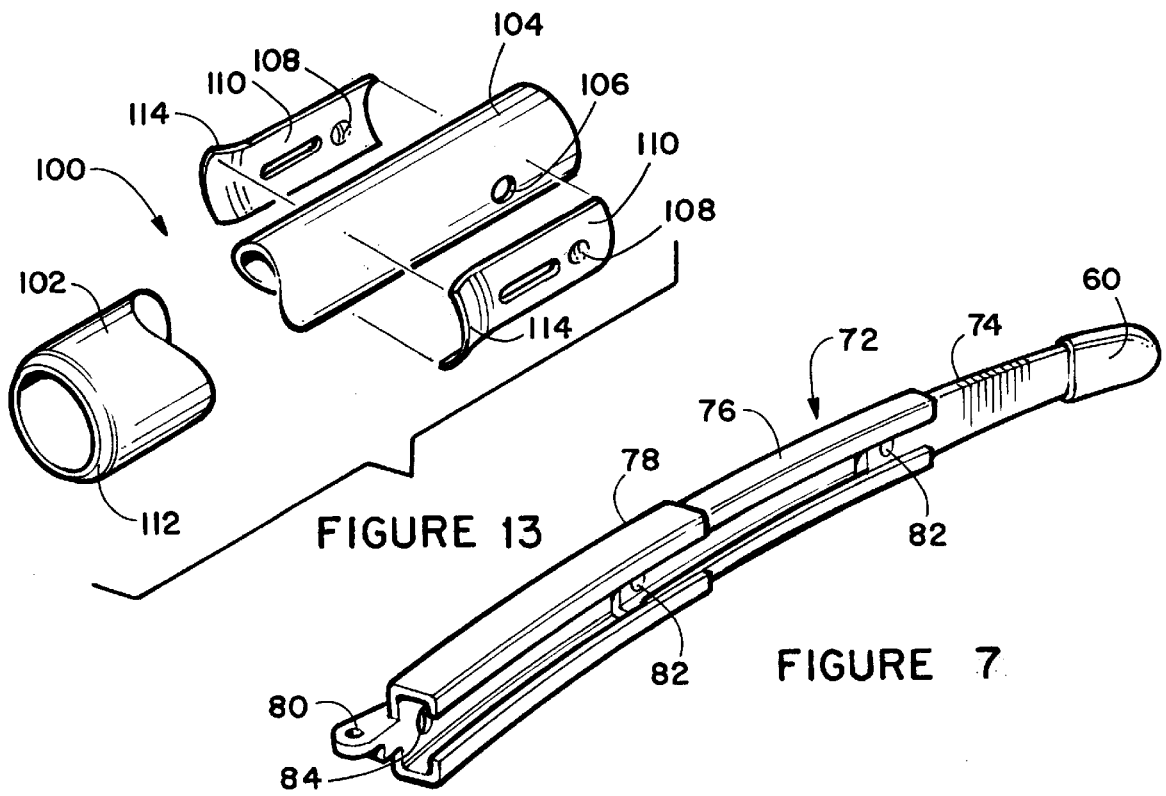
FIGURE 13
FIGURE 7

FOLDING EYE GLASS FRAMES WITH LENGTH ADJUSTABLE TEMPLES

FIELD OF THE INVENTION

The instant invention is directed to improved compact foldable glasses, and more particularly to glasses that have telescopic temples that can be length adjustable to an infinite number of different lengths between minimum and maximum length and yet maintain an inwardly bowed configuration at any selected different length.

BACKGROUND OF THE INVENTION

Spectacles or as commonly referred to as glasses have been around for a considerable length of time for the visually impaired. Glasses have been made as small as practical or have various foldable elements to reduce the physical size for carry around convince.

Foldable glasses include frames that fold in the middle and temples that fold at one or more locations along their length to reduce the physical size of the glasses for transport.

Typical state of the art compact folding glasses can be found in the following United States Patents: U.S. Pat. No. 2,419,303 issued to inventor W. G. Vasey on Apr. 22, 1947 which includes folding frames and temples; U.S. Pat. No. Des. 165,721 issued to M. Rand on Jan. 22, 1952 which shows folding frames and temples; U.S. Pat. No. 2,814,968 issued to W. S. Dixon, Jr. on Dec. 3, 1957 which shows foldable frames and temples; U.S. Pat. No. 4,681,410 issued to Al W. Paulsen on Jul. 21, 1987 which teaches a foldable frame and a showing of a different type folding temples; U.S. Pat. No. 4,768,872 by Michael Fraslle et al. On Sep. 6, 1988 which teaches a temple with an extendable length; U.S. Pat. No. 5,384,604 by Chang which teaches collapsible glasses which has foldable frames and fold along the temples at various locations; and U.S. Pat. No. 5,532,766 by David G. Maleer et al. which teaches foldable frames and temples.

There is a continuing need for improved foldable glasses that have new and unusual features that make the glasses foldable to a small compact size and yet when they are unfolded for use provide features not unlike non-foldable conventional eye glasses.

SUMMARY OF THE INVENTION

The glasses of this invention include frames that are foldable about the center thereof, temples that are telescopic to a plurality of different lengths to accommodate users of different head sizes. The temples are bowed toward each other and maintain substantially the same degree of bowing at any selected temple length. The temples are formed with a plurality of nestable telescopic elements that are extendable from a fully nested (stowed position) to a full deployed or extended position. A locking spring positioned between the telescopic elements maintains the telescopic elements in an selected length position between fully nested stowed position for folding or fully extended positions for maximum length use. The distal temple telescopic element can be formed of a material such as plastic or metal that has a memory which is formed curvilinearly to fit comfortably over the ear of a user of the glasses and be nested into the linear adjacent telescopic element when placing the temple in the stowed position and when again deployed for extended length retains the curvilinear pre-form.

The cross section of the telescopic temple elements is other than round to prevent relative rotation of the telescopic elements. In order to prevent relative rotation the telescopic elements have a cross section form of oval, curvilinear at opposite ends and rectilinear between the curvilinear ends, rectangular or "C" shaped.

The locking means between the telescopic elements is formed by a preformed metal or plastic shim attached to the inner translating telescopic element and is preformed in a manner that constantly applies pressure to the inner walls of the over lying telescopic element thereby locking the elements in any selected translated position. The distal end of each telescopic element includes a flange which engages the end of the locking spring to prevent the telescopic elements from becoming disengaged when fully extended.

In another embodiment, the bridge which pivots in the middle to allow the frame to fold and place the inner surface of the lens together is translatable to move the frame lens holding portions to move in and out relative to each other. The translatable bridge is extended to place the frame portions at a relative spaced apart position to fit the needs of the user and positioned together when folding the frame for storage.

In another embodiment of the bridge of the glasses the two pivotal sides of the bridge are translatable up and down to provide the temples with the same elevation when the glasses are in use and enable the temples to be positioned adjacent to each other when the glasses are folded.

An object of this invention is to construct a compact pair of folding glasses that are substantially conventional glasses size when in use and folded to a very small compact size for storage or transport.

Another object of this invention is to provide temples that are length extendable telescopically by use of a plurality of nested telescopic elements that can extend to a minimum temple length when deployed and nest one within the other when in a stowed minimum temple length position.

Yet another object of this invention is to provide length adjustable temples that will maintain a selected length when in use.

Still another object of this invention is to provide the temple with a distal telescopic element that can be formed in a curved fashion from material that has a memory so that when the distal end of said temple is translated within its attached telescopic element it will straighten out for minimizing the temple length and again take it curved form when the temple length is extended.

Still another object of this invention is to provide a pivotal bridge wherein each side of the pivoting portions are have spring bias up and down movement for substantially equal temple elevation when the glasses are in use and at unequal elevations when the glasses are folded for non-use and storage.

These and other objects and features will become apparent when the specifications are read in view of the following drawing Figures.

BRIEF DESCRIPTION OF THE DRAWING FIGURES

FIG. 1 depicts a perspective showing of the foldable glasses of the invention in their minimum size folded state adjacent to a case therefore;

FIG. 2 is a front view showing of the foldable glasses of FIG. 1;

FIG. 3 is a front view showing the frame in a use position;

FIG. 4 is a top view showing of the temples of the glasses of FIG. 3 with the telescopic elements extended;

FIG. 5 is a side view of a third embodiment of the temples of the invention having four telescopic elements;

FIG. 6 is a rear view showing the frame in the FIG. 3 in user configuration with curvilinear temple distal ear engaging ends;

FIG. 7 is a perspective showing of a third embodiment of the temples of the invention;

FIGS. 9–12 show different embodiments of the cross sections of the temples taken along line 8–11 of FIG. 5;

FIG. 13 is an exploded section of a portion of the temple showing two telescopic elements with an inner telescopic element with position locking means and the end flange stop means on the outer one of the two telescopic elements;

FIG. 14 is a top plan view of an extendable bridge.

DETAILED DESCRIPTION OF THE PROFFERED EMBODIMENTS

Figure 8:
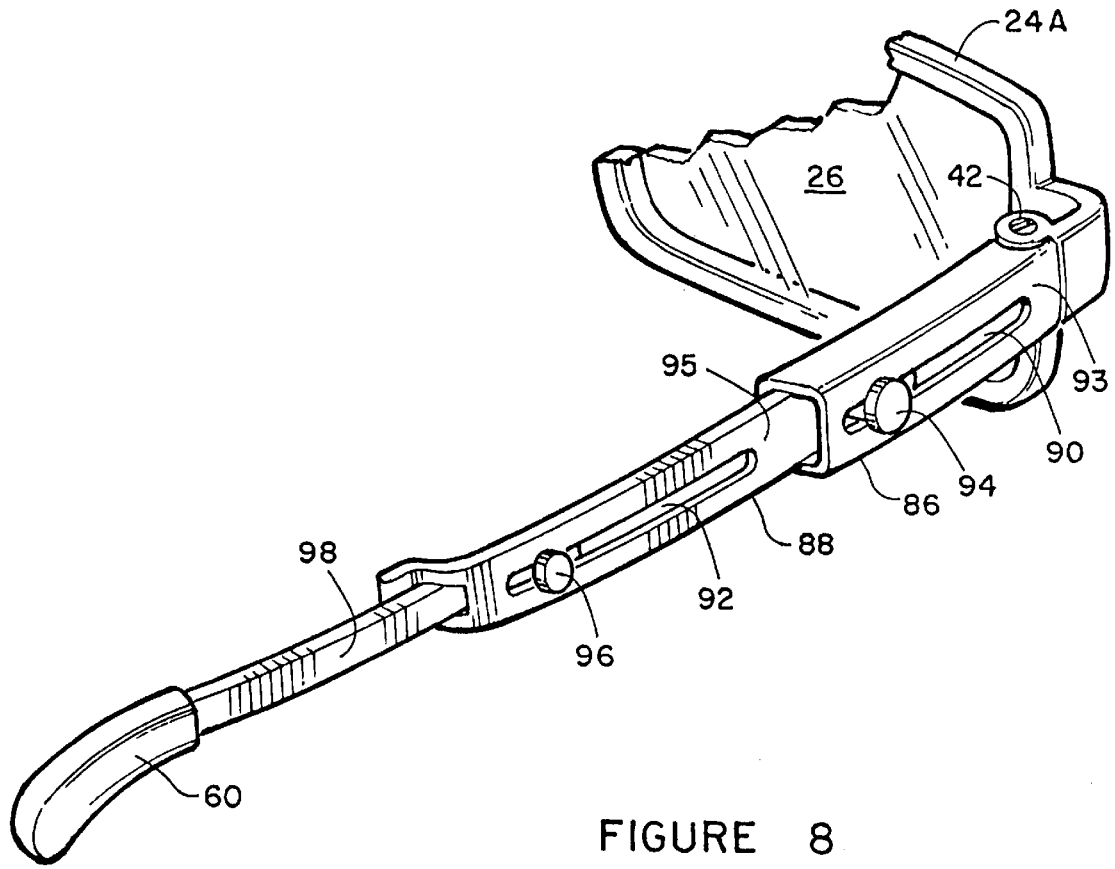
FIG. 8 is a perspective showing of fourth embodiment of the temples of the invention.

Referring now the drawing Figures and specifically to drawing FIGS. 1 through 4. A pair of folding glasses 20 are shown in their small compact folded position with the temples telescoped inward to their minimum length position with the glasses of FIG. 1 positioned adjacent to a convenient case 22.

The frame is made of two segments 24A and 24B each holding a lens 26 and 28 respectively. A bridge 30 which pivots at 32 connects the two frame segments 24A and 24B. Pivot 32 allows the two frame segments to rotate toward each other about the pivot see the various Figures.

A pair of temples 34 and 36 are pivotally attached at frame segments ends 38 and 40 respectively through a pivot 42, see FIGS. 1–4. As can be seen in drawing FIG. 3, the pivot 32 is offset from a line 44 along line 45 which is normal to the upper surface 46 of the bridge 30.

Tabs 48 and 50 are fixedly attached to the frame segments on the side of the frames opposite to the temple attachment adjacent to the bridge 30.

Referring now to drawing FIG. 4, the temples 34 and 36 are constructed by the nesting together telescoping elements 52, 54 and 56. As shown the element 56 telescopes within element 54 and element 54 telescopes within element 52. As can be seen from the various Figures element 52 is pivotally attached to the frames at 24B and 24B as herein before described. At the distal end of element 56 is positioned a soft distal tip 60 for user comfort.

Referring now specifically to drawing FIG. 5, a second embodiment of the temple 57 of the invention is shown, an additional telescoping element 58 is utilized in this embodiment. The additional telescoping element 58 of temple 62 allows the temples to extend further than the temple 34, 36 and yet is collapsible to a small length as are temples 34, 36. The temple 62 has a formed tip 63 at its distal end. The tip 63 can be soft or firm as desired.

A third embodiment of the temples of FIG. 6 depict the temples in their telescopic extended position. The temples 67 are generally the same configuration as those shown in FIGS. 4 and 5, hereinbefore described, except that the distal telescoping elements 68 of each are constructed of a material that is preformed and has a memory as preformed. This feature allows the ends 68 to be straightened out for insertion into the adjacent telescoping element 70 and when later extended take the ear curve configuration as shown in FIG. 4.

FIG. 7 depicts a third embodiment 72 of the temples of the invention. The temples 72 have an open channel configuration as shown in drawing FIG. 12. Telescopic segments 74, 76 and 78 like the other embodiments telescope one within the other. Element 74 telescopes into element 76, element 76 telescopes into element 78 and element 78 is attached by a pivot 42 at aperture 80. The elements 74–78 remain in any selected extended position by a protrusion 82 which bears against the inner adjacent surface of the outer telescopic element. The elements can be nested by pressing the telescopic element inward against the friction of the protrusion 82.

FIG. 8 depicts a fourth embodiment 88 of the temple of the invention. This embodiment differs from the drawing FIG. 7 showing in that telescoping elements 86 and 88 are rectangular in cross-section as shown in drawing FIGS. 11 or 12 and include slots 90 and 92. Passing through slots the 90 and 92 are pins 94 and 96. Pin 94 is fixedly attached to telescopic element 88 and pin 96 is attached to the distal telescoping element 98. The curvature of the telescopic elements allows the head of the pins 94, 96 to bind along the surfaces 93 and 95 so the temple lengths can be selectively length adjusted and will remain at that selective adjustment unless the telescopic elements are physically moved. The end tip 60 is a herein before described.

FIGS. 9–11 depict various configurations of the temple cross-section taken along line 9,10,11 of FIG. 4.

FIG. 13 depicts the internal temple telescopic element locking mechanism 110 which prevents the elements from separating from the outer element when the inner element is fully deployed to a maximum un-nested position. Although the telescopic element 102 and nesting telescopic section 104 are shown as substantially oval in cross-section, as shown in drawing FIG. 9, they can take any cross-sectional shape and especially those shapes shown in drawing FIGS. 10–12. As can be seen in the drawing FIG. 13, element 104 is translatable within element 102. The inner element has a bore 106 substantially through the diameter of 104. The bore 106 mates with protrusions 108 which locks the biasing spring 110 to the segment 104 when inserted into the segment 102. The tip 112 of element 102 is beveled inwardly thereby reducing the cross-section area at the tip 112 relative to the general cross-section configuration of element 104. The combination of the reduced cross-section and the tips 114 of the pair of bias springs 110 prevents the smaller cross-section of the inner element 104 from being removed from the larger outer element 102. The biasing spring 110 is constructed of any spring material either metal or plastic that has a memory and returns to its preformed configuration when non-confined. The biasing spring 110 is formed with a slightly smaller inner concave configuration than the outer configuration of the attached to element 104. This feature causes the bias spring to continue to try to return to it preformed configuration. As spring 110 is confined between the inner surface of element 102 and the outer surface of element 104 and has a greater convex configuration than the concave surface of the biasing spring 110, the outer convex surface of the biasing spring bears against the inner surface of element 102 thus enabling the positioning of the element 104 at any selected position along the inner surface of element 104 and maintaining that position due to the force of the biasing spring against the inner surface of element 102. In addition the spring force of the biasing spring maintains the protrusions 108 in the apertures of the bore 106.

Referring now to drawing FIG. 14 which depicts the expandable or telescoping bridge 116 of the invention. The distal ends 118 of the frame segments 24A and 24B are of a reduced configuration and are nestable in apertures in each side of the bridge 116. The ends 118 are translatable along a path shown by the adjacent arrows to increase or decrease the bridge length to accommodate different spacing of user's eyes and to reduce the bridge length to a minimum for folding the glasses to the smallest dimension.

Figure 15:
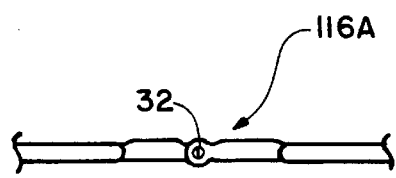
FIG. 15 is a top view of a third embodiment of the pivotal bridge.
Figure 17:
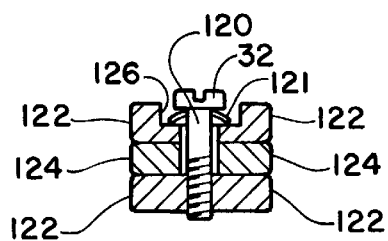
FIG. 17 is a section showing taken along line 17—17.
Figure 16:
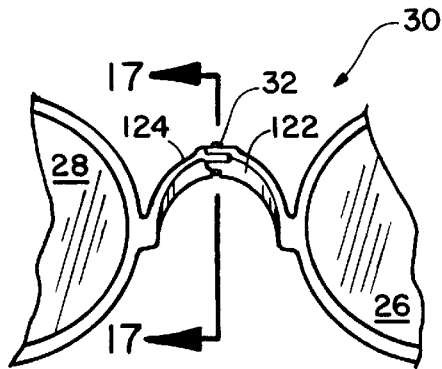
FIG. 16 is a partial showing of foldable glasses with the up and down translatable bridge of FIG. 15.

FIG. 15 is a top view of a the embodiment of a bridge 116A. FIG. 16 depicts a view of a pair of glasses looking from the wearer outwardly from the rear of the glasses 30 toward the front thereof. FIG. 17 is a partial cutaway taken along line 17—17 of FIG. 16. Referring now to FIG. 17, the pivot 32 is shown as a screw passing through a spring 121 which can be a leaf spring, Belville washer or the like suitable for the purpose intended, through the upper portion of bridge portion 122, through the opposite bridge portion 124 and threaded engaged into the lower portion of 122 where it is fixedly attached thereto. As shown in drawing FIG. 16 the bridge portion 122 is bifurcated into upper and lower portions. The purpose of the third embodiment of the bridge pivot is to allow he temples to be on the same elevation when the glasses are in use and to enable the temples to be adjacent to each other at different elevations when folded. The spring allows the frame portions 24 and 24A to have relative translation up and down or side-to-side or a combination of up and side-by-side movement within the cavity 126 thus allowing the temples to be displaced for adjacent positioning when the frame portions are folded together. The bridge 116A is formed to eliminate the need for nose pads.

The frames and temples can be constructed from any material suitable for the purpose and result required, such as, but not limited to metal or plastic. The spring is shown as a leaf spring it should, however, be understood that any type spring may be used that is suitable for the purpose described.

Therefore, it should be understood that the particular embodiments shown in the drawings and described within the specifications are for the purpose of example and should not be construed to limit the invention which will be described in the claims below. Now that a number of examples of the apparatus of the invention have been given, numerous other applications should be evident to one skilled in the art. Further, it is evident that those skilled in the art may now make numerous uses and modifications of the specific embodiments described herein. It should be obvious that the various members described may be made from a variety of materials and using a wide combination of dimensions. Consequently, the invention is to be construed as embracing each and every novel feature and novel combination of the features present in or possessed by the apparatus described herein.

What is claimed is:

1. Compact foldable eye glasses comprising:

a pair of lens frames each holding an optical lens attached together by a bridge, said bridge having a central pivot for allowing said pair of frames to fold toward each other in a overlapping relationship;

a pair of temples pivotally attached to each of said lens frames at the frame end opposite said bridge, each of said temples having a plurality of linearly translatable nested telescopic elements for deployment between a stowed position where they are fully nested and said temple is at its minimum length to a deployed position where they are fully extended and said temple is at its maximum length, said temples are selectively length adjustable at an infinite number of different temple lengths between said telescopic elements stowed and deployed positions, said telescopic elements having a cross section that prevents relative rotation there between, said temples being bowed inwardly toward each other at any one of the selected temple lengths and said temples pivot inward toward said lens for nesting between said lens when said frames are pivoted toward each other in said overlapping position; and combination locking and stop means for locking said telescopic elements at any selected length through the range of said infinite number of different temple lengths and preventing said telescopic elements from becoming disengaged at their maximum deployed positions, said stop means for preventing disengagement of said telescopic elements comprises a flange at the end of each outer surface of said plurality of telescopic elements except the distal end one of said telescopic elements said flange engages a spring member that translates with its attached telescopic element translating within said telescopic element having said flange whereby said spring member engages said flange thereby preventing said telescopic elements from becoming disengaged at their maximum translated position and said stop means for maintaining the relative selected extended positions of adjacent telescopic elements comprises a spring member that is attached to an inner telescopic member translatable within an outer telescopic member which bears against the inner wall of said outer telescopic member.

2. The invention as defined in claim 1 wherein the central pivot of said bridge is at an angle for allowing said temples to be positioned side by side when pivoted to a position between said lens.

3. The invention as defined in claim 1 wherein said bridge is length translatable between a minimum length position to a maximum length position.

4. The invention as defined in claim 1 wherein said temples are biased toward each other.

5. The invention as defined in claim 1 wherein said temples have an oval cross-section.

6. The invention as defined in claim 1 wherein said temples have a cross-section with the ends curvilinear and the sides rectangular.

7. The invention as defined in claim 1 wherein said temples have a rectangular cross-section.

8. The invention as defined in claim 7 wherein said rectilinear cross-section is rectangular.

9. The invention as defined in claim 1 wherein said temples have a C shaped cross-section.

10. The invention as defined in claim 1 wherein said telescopic elements have friction locking means between the plurality of telescopic elements when in a stowed position and said locking means maintains each of said telescopic elements any selected extended location between stowed and fully deployed positions.

11. The invention as defined in claim 1 wherein the most distal one of said plurality of telescopic elements is formed of a material which has a memory that forms a curvilinear distal end on said temple and can be telescoped within a rectilinear one of said telescopic elements when said telescopic elements are in a stowed minimum temple length position.

12. The invention as defined in claim 1 wherein said bridge comprises a central pivot connection for allowing relative up and down movement between the pivotal bridge portions.

13. The invention as defined in claim 12 wherein said up and down movement is biased in a maximum downward position by biasing means.

14. The invention as defined in claim 13 wherein said biasing means is a leaf spring.

15. The invention as defined in claim 1 wherein said bridge comprises a central pivot connection for allowing side-by side relative movement between the pivotal bridge portions.

16. The invention as defined in claim 1 wherein said bridge comprises a central pivot connection for allowing relative up and down and side-by-side movement between the pivotal bridge portions.

* * * * *